(12) United States Patent
Bamberg et al.

(10) Patent No.: US 7,985,051 B2
(45) Date of Patent: Jul. 26, 2011

(54) GAS TURBINE VANE

(75) Inventors: Joachim Bamberg, Dachau (DE); Franz Heitmeir, Graz (AT); Axel Rossmann, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 1097 days.

(21) Appl. No.: 10/590,868

(22) PCT Filed: Feb. 26, 2005

(86) PCT No.: PCT/DE2005/000329
§ 371 (c)(1),
(2), (4) Date: May 24, 2007

(87) PCT Pub. No.: WO2005/083234
PCT Pub. Date: Sep. 9, 2005

(65) Prior Publication Data
US 2007/0217916 A1 Sep. 20, 2007

(30) Foreign Application Priority Data
Feb. 28, 2004 (DE) .......................... 10 2004 009 755

(51) Int. Cl.
*B64C 21/00* (2006.01)
(52) U.S. Cl. .................................. 416/223 A; 416/241 R
(58) Field of Classification Search ................ 416/223 A
See application file for complete search history.

(56) References Cited

U.S. PATENT DOCUMENTS

| | | | | |
|---|---|---|---|---|
| 4,930,729 A * | 6/1990 | Savill | ............................ | 244/200 |
| 5,069,403 A * | 12/1991 | Marentic et al. | ............... | 244/130 |
| 5,337,568 A | 8/1994 | Lee et al. | ......................... | 60/755 |
| 5,653,110 A | 8/1997 | Lee et al. | ......................... | 60/756 |
| 5,681,661 A | 10/1997 | Kelly | ............................ | 428/601 |
| 5,860,626 A | 1/1999 | Moser | ............................ | 244/200 |
| 6,488,238 B1 * | 12/2002 | Battisti | ......................... | 244/204 |
| 6,666,646 B1 * | 12/2003 | Van Ierland et al. | .......... | 415/177 |
| 6,729,846 B1 * | 5/2004 | Wobben | .................... | 416/241 A |

FOREIGN PATENT DOCUMENTS

| | | |
|---|---|---|
| DE | 101 59 056 | 6/2003 |
| EP | 1 186 749 | 3/2002 |
| JP | 11-117703 | 4/1999 |
| WO | WO 03/104615 | 12/2003 |

OTHER PUBLICATIONS

D.W. Bechert et al., "Fluid Mechanics of Biological Surfaces and their Technological Application", Naturwissenschaften No. 87, 2000, pp. 157-171, XP002331781.

* cited by examiner

*Primary Examiner* — Edward Look
*Assistant Examiner* — Ryan H Ellis
(74) *Attorney, Agent, or Firm* — Davidson, Davidson & Kappel LLC

(57) ABSTRACT

A gas turbine vane, especially a vane pertaining to an aircraft engine, comprising a blade and a vane footing. The blade is defined by a flow inlet edge or a front edge, a flow outlet edge or a rear edge, and a blade surface extending between the front edge and the rear edge and forming a suction side and a pressure side. The suction side of the blade includes at least one microprofiled or microstructured region for optimizing the flow around the blade.

10 Claims, 2 Drawing Sheets

GAS TURBINE VANE

BACKGROUND

The present invention relates to a gas turbine vane, in particular a vane of an aircraft engine.

Gas turbines, such as aircraft engines for example, are made up of multiple subassemblies, namely a fan, preferably multiple compressors, a combustion chamber, and preferably multiple turbines. For improving the efficiency and the working range of such gas turbines it is necessary to optimize all subsystems or components of the gas turbine. The present invention relates to the improvement of the flow-around behavior of gas turbine vanes, in particular of rotary vanes of a compressor of the gas turbine.

As a rule, compressors of gas turbines are made up of multiple stages, which are situated axially consecutively in the flow, each stage being formed by a rotary vane ring formed by rotary vanes assigned to a rotor. The rotary vanes forming the rotary vane ring and assigned to the rotor rotate together with the rotor vis-à-vis the stationary guide vanes and a likewise stationary housing. For reducing manufacturing costs, an increasingly compact compressor design having the lowest possible number of stages is aimed for. Furthermore, the overall pressure conditions within the gas turbine and thus the pressure ratios between the individual stages increase due to the constant optimization of the efficiency and the working range of such compressors.

Increasingly larger stage pressure ratios and an increasingly smaller number of stages inevitably result in higher circumferential velocities of the rotating components of the compressor. The rotational speeds, which increase with the reduction of the number of stages, result in increasing mechanical stresses in particular on the rotary vanes rotating together with the rotor and in supersonic flow conditions within the vane grid. Such flow conditions require an optimized, aerodynamic design of the gas turbine vanes.

SUMMARY OF THE INVENTION

An object of the present invention is to create a novel gas turbine vane.

According to the present invention, the suction side of the blade of the gas turbine vane has at least one micro-profiled or micro-structured area to optimize a flow around the suction side or the blade.

In terms of the present invention, a gas turbine vane is proposed which has a clearly improved flow behavior. According to the present invention, at least one micro-profiled or micro-structured area is provided on the suction sides of the blades of gas turbine vanes for optimizing the efficiency of a gas turbine. According to the present invention, a flow separation, which is to be prevented, takes place on a gas turbine vane primarily on the suction side of the blade or the gas turbine vane, the suction side of a gas turbine vane being less heavily exposed to wear, e.g., erosion, or to contamination and therefore the suction side may be provided with effective micro-profiles or micro-structures. Using such micro-structures or micro-profiles of the gas turbine vane on its suction side, it is possible to stabilize the flow around the gas turbine vane and thus to optimize the operating range and ultimately the working range of the gas turbine.

According to an advantageous refinement of the present invention, the or each micro-profiled or micro-structured area is assigned to a section of the suction side of the blade at which flow deceleration takes place. This section extends in particular over between 30% and 70% of the profile depth of the blade.

The or each micro-profiled or micro-structured area has preferably a shark skin-like profile or structure.

BRIEF DESCRIPTION OF THE DRAWINGS

Preferred refinements of the present invention arise from the following description. An exemplary embodiment of the present invention is, without being limited thereto, explained in greater detail based on the drawings.

DETAILED DESCRIPTION

The present invention is described in greater detail in the following with reference to FIGS. 1 and 2.

Figure 1:
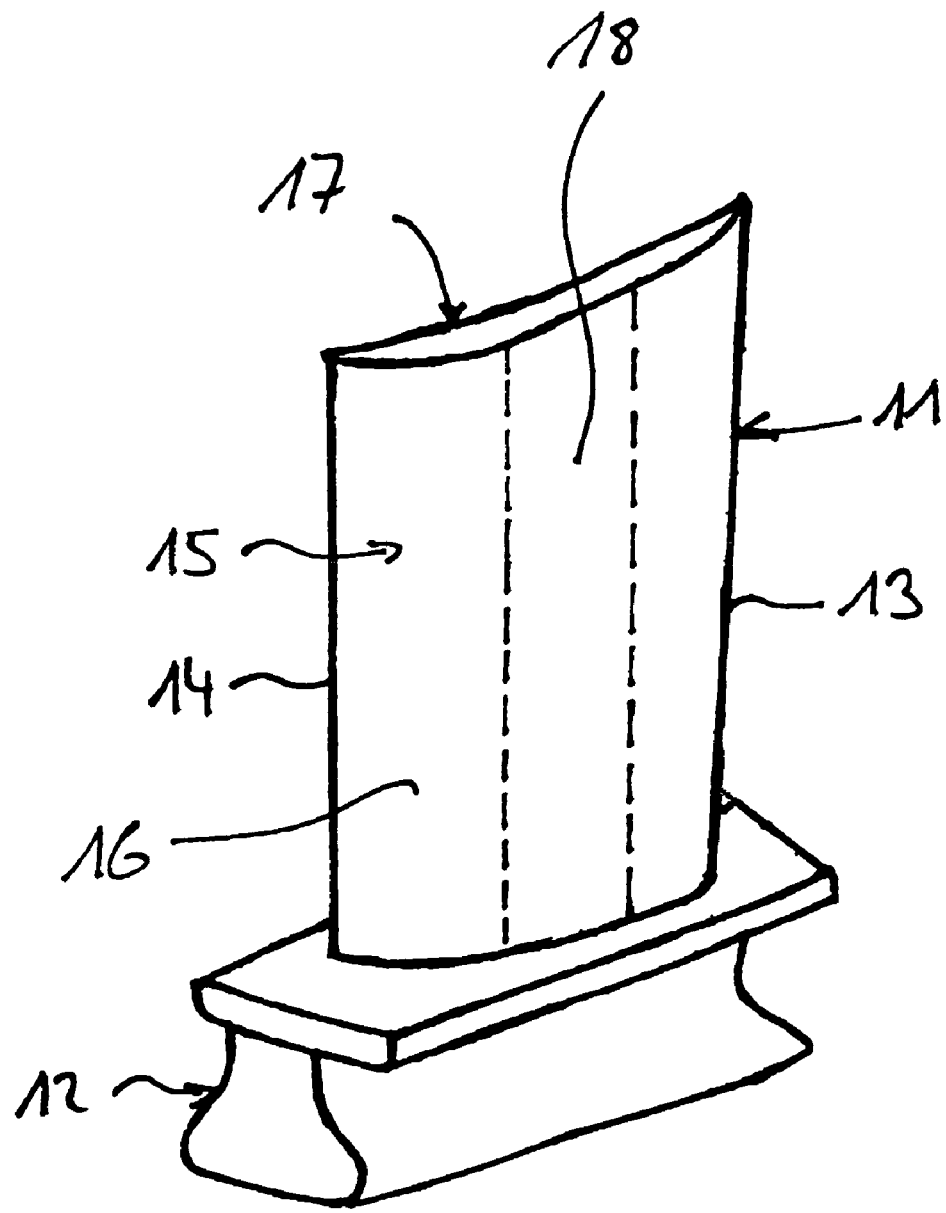
FIG. 1 shows a gas turbine vane according to the present invention in a first exemplary embodiment of the invention in a highly schematized, perspective side view.

FIG. 1 shows a gas turbine vane 10 according to the present invention in a perspective side view. Gas turbine vane 10 in FIG. 1 includes a blade 11 as well as a vane foot 12 attached to it. Blade 11 is delimited by a flow inlet edge or front edge 13, a flow outlet edge or rear edge 14 and a blade surface 15 extending between front edge 13 and rear edge 14. Blade surface 15 forms a suction side 16 and a pressure side 17 of blade 11 of gas turbine vane 10.

In terms of the present invention, at least one micro-structured or micro-profiled area is assigned to suction side 16 of blade 11.

Only one single such micro-profiled or micro-structured area 18 is present in the exemplary embodiment of FIG. 1. According to FIG. 1, this area extends over the entire radial height of blade 11.

Micro-profiled area 18 is assigned to a section of suction side 16 in which flow deceleration takes place. Starting at front edge 13 of blade 11 of gas turbine vane 10, first a flow acceleration and subsequently a flow deceleration take place on suction side 16. The danger of flow separation exists in particular in the areas of suction side 16 of blade 11 in which the flow deceleration takes place. In terms of the present invention, micro-profiled or micro-structured area 18 is precisely situated in this section of suction side 16 in which a flow deceleration takes place. This area extends preferably over between 30% and 70%, in particular between 30% and 50%, of the profile depth of blade 11. It is thus assigned to a central area of suction side 16 of blade 11.

Particularly preferred is an embodiment of the present invention in which micro-profiled or micro-structured area 18 has a shark skin-like profile or structure. Such a structured area 18 of suction side 16 of blade 11 creates a particularly preferred flow around gas turbine vane 10.

Figure 2:
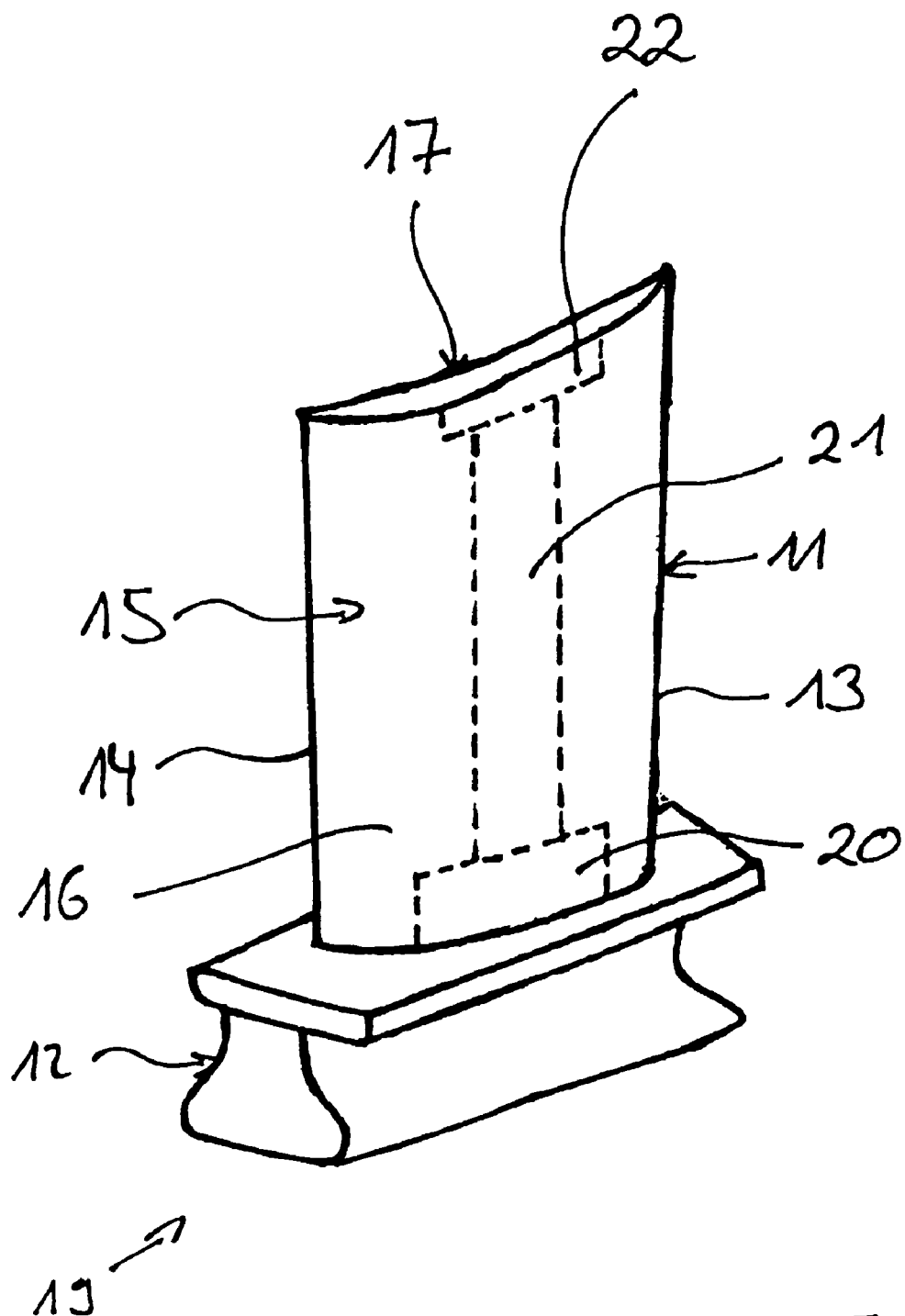
FIG. 2 shows a gas turbine vane according to the present invention in a second exemplary embodiment of the invention in a highly schematized, perspective side view.

FIG. 2 shows another exemplary embodiment of a gas turbine vane 19 according to the present invention. Since gas turbine vane 19 in FIG. 2 corresponds in essence to gas turbine vane 10 in FIG. 1, the same reference numerals are used for the same subassemblies for the sake of avoiding unnecessary repetitions. Merely the differences between the two exemplary embodiments in FIGS. 1 and 2 will be addressed in the following.

The exemplary embodiment in FIG. 2 differs from the exemplary embodiment in FIG. 1 in that multiple different micro-profiled or micro-structured areas are assigned to suction side 16 of blade 11, namely three different areas 20, 21, and 22 in the exemplary embodiment in FIG. 2.

In the area of suction side 16 of blade 11, gas turbine vane 10 of the exemplary embodiment shown in FIG. 2 has a first area 20 on the side of the vane foot, which has a micro-profile or a micro-structure as set forth in the present invention. This first area 20 on the side of the vane footing is assigned to an area of blade 11 that is exposed to high vibration stresses. Area 20 is preferably micro-profiled or micro-structured in such a way that blade 11 is strengthened in this area 20 and/or that compressive stresses are induced. This makes it possible to optimize the strength characteristics of blade 11 in addition to a positive effect on the flow around it.

Area 21, radially externally adjacent to area 20, also has a preferably shark skin-like micro-profile or a micro-structure, as in the exemplary embodiment in FIG. 1.

A third, micro-profiled or micro-structured area 22 is assigned to the radially externally positioned blade tip of blade 11. This makes it possible, for example, to optimize the flow in the gap area between gas turbine vane 19, designed as a rotary vane, and a stationary housing.

As shown in FIG. 2, both micro-profiled or micro-structured areas 20 and 22 extend over a larger section of the profile depth than micro-profiled or micro-structured area 21.

A gas turbine vane is thus proposed where at least one micro-profiled or micro-structured area is assigned to the suction side of the blade of the gas turbine vane. This micro-profiled or micro-structured area is assigned to that section of the suction side of the blade which is particularly at risk regarding a possible flow separation. The present invention is based on the recognition that precisely this section of the suction side is only slightly stressed with regard to erosion or contamination, so that the micro-structured or micro-profiled area of the suction side of the blade retains its effectiveness even during operation of the gas turbine. In addition to optimizing the flow around the blade, the strength of the gas turbine vane may be positively affected with the aid of the micro-profiled or micro-structured areas. The improved flow around the gas turbine vanes, designed according to the present invention, results in a greater compression limit and thus in improved efficiency of the gas turbine.

The gas turbine vanes designed according to the present invention are rotary vanes preferably of a compressor of the gas turbine.

Finally, it should be pointed out that the or each micro-profiled area on the suction side of the gas turbine vane may be machined into the suction side of the blade in a defined manner using laser, sputtering, or other removal methods. Cost-effective production is possible since the suction side is provided with the or each micro-profiled area only in a narrowly limited section.

What is claimed is:

1. A rotary vane of a compressor of a gas turbine comprising:
a vane foot; and
a blade, the blade being delimited by a flow inlet edge or front edge, a flow outlet edge or rear edge, and a blade surface extending between the front edge and the rear edge and forming a suction side and a pressure side, the suction side of the blade having a non-micro-profiled and non-micro-structured area in a flow acceleration section, and having at least one micro-profiled or micro-structured area for optimizing flow around the blade between the front edge and the rear edge of the suction side in a flow deceleration section.

2. The rotary vane as recited in claim 1 wherein, the flow deceleration section is in a central area, and the flow acceleration section extending from the front edge to the central area.

3. The rotary vane as recited in claim 1 wherein the at least one micro-profiled or micro-structured area extends between 30% and 70% of a profile depth of the blade.

4. The rotary vane as recited in claim 3 wherein the at least one micro-profiled or micro-structured area extends between 30% and 50% of the profile depth of the blade.

5. The rotary vane as recited in claim 1 wherein the at least one micro-profiled or micro-structured area has a shark skin-like profile or structure.

6. The rotary vane as recited in claim 1 wherein the at least one micro-profiled or micro-structured area includes a first area having a first depth across the profile depth of the blade and a further micro-profiled or micro-structured area neighboring the vane foot and having a larger depth than the first depth.

7. The rotary vane as recited in claim 1 wherein the vane is an aircraft engine blade.

8. The rotary vane as recited in claim 1 wherein the suction side has a second non-micro-profiled and non-micro-structured section extending from the at least one micro-profiled or micro-structured area to the rear edge.

9. The rotary vane as recited in claim 1 wherein the at least one micro-profiled or micro-structured area extends between the vane foot to a blade tip.

10. The rotary vane as recited in claim 1 wherein the at least one micro-profiled or micro-structured area includes a first area having a first depth across the profile depth of the blade, a further micro-profiled or micro-structured area neighboring the vane foot and having a larger depth than the first depth, and a second further micro-profiled or micro-structured area neighboring the vane tip and having a second larger depth than the first depth.

* * * * *